United States Patent [19]

Belcher et al.

[11] Patent Number: 5,016,436
[45] Date of Patent: May 21, 1991

[54] INTERTURBINE DUCT

[75] Inventors: Bryan L. Belcher; Michael T. Todman, both of Warwick, England

[73] Assignee: Rolls-Royce plc, London, England

[21] Appl. No.: 237,710

[22] Filed: Aug. 29, 1988

[30] Foreign Application Priority Data

Oct. 20, 1987 [GB] United Kingdom ............... 8724537

[51] Int. Cl.⁵ .............................................. F02K 3/04
[52] U.S. Cl. ................................... 60/264; 60/39.161
[58] Field of Search ............... 60/264, 39.36, 39.161, 60/39.17; 415/115, 179

[56] References Cited

U.S. PATENT DOCUMENTS

| 2,312,995 | 3/1943 | Anxionnaz et al. | 60/39.17 |
| 3,255,586 | 6/1966 | Hennig et al. | 60/39.161 |
| 3,408,044 | 10/1968 | Burger | 415/179 |
| 3,469,787 | 9/1969 | Marsh et al. | 60/264 |
| 4,187,054 | 2/1980 | Landis, Jr. et al. | 415/115 |
| 4,627,233 | 12/1986 | Baran, Jr. | 60/39.161 |

FOREIGN PATENT DOCUMENTS

| 600025 | 3/1948 | United Kingdom . |
| 751884 | 7/1956 | United Kingdom . |
| 1051244 | 12/1966 | United Kingdom . |
| 1220223 | 1/1971 | United Kingdom . |
| 2019503 | 10/1979 | United Kingdom . |

Primary Examiner—Louis J. Casaregola
Assistant Examiner—Timothy S. Thorpe
Attorney, Agent, or Firm—Cushman, Darby & Cushman

[57] ABSTRACT

An interturbine duct for interconnecting a gas turbine engine with a power turbine. The interturbine duct is of generally frusto-conical form and double skinned so that an annular cross-section volume is defined between the skins. Cooling air introduced in a generally tangential direction at the larger diameter extent of the duct follows a generally spiral path to the smaller diameter extent where it is exhausted into the efflux of the gas turbine engine. The spiral path of the cooling air ensures good heat transfer coefficients over both of the skins and obviates the need for baffles to direct the cooling air flow.

6 Claims, 1 Drawing Sheet

INTERTURBINE DUCT

FIELD OF THE INVENTION

This invention relates to an interturbine duct, that is, the duct which interconnects a gas turbine engine with a power turbine adapted to be driven by the exhaust efflux of that engine.

BACKGROUND OF THE INVENTION

Gas turbine engines which are intended for industrial or marine use are typically adapted to drive a power turbine through an interturbine duct. Thus the exhaust efflux nozzle of the engine is connected to the inlet of a power turbine by the interturbine duct. The interturbine duct must, of course, have to withstand the high temperatures associated with the efflux of a typical gas turbine engine and so, can be made in single skin form from an exotic heat resistant alloy such as a nickel based alloy. However such alloys tend to be expensive and other drawbacks associated with the possible consequences of any structural failure of the duct or the leakage of hot, corrosive exhaust gases from the connecting joints of the duct, tend to discourage their use.

An alternative approach is to manufacture the interturbine duct from cheaper, less exotic alloy and cool the duct with, for instance, air tapped from the compressor of the gas turbine engine. However typical methods of providing duct cooling usually entail the use of large numbers of ducts and baffles which unfortunately are prone to failure as a result of the considerable buffetting, vibration and thermal fatigue which they would be likely to encounter in normal use.

It is an object of the present invention to provide a cooled interturbine duct which substantially avoids the drawbacks referred to above.

SUMMARY OF THE INVENTION

According to the present invention, an interturbine duct, suitable for interconnecting the exhaust nozzle of a gas turbine engine with the inlet of a power turbine which is adapted to be driven by the exhaust efflux of any such gas turbine engine, is of generally frusto-conical configuration and double skinned construction, said skins being radially spaced apart and of generally corresponding configuration so that they cooperate to define an annular cross-section, volume of generally frusto-conical configuration, said radially inner skin defining a passage for the exhaust efflux of said gas turbine engine, means being provided at the larger diameter extent of said duct to introduce a cooling fluid into said defined volume in a direction which is generally tangential to the circumference of said duct so that said cooling fluid flows in a generally spiral-shaped path through said defined volume to the smaller diameter extent of said duct, means being provided at said smaller diameter extent to exhaust said cooling fluid from said defined volume.

BRIEF DESCRIPTION OF THE DRAWINGS

The invention will now be described, by way of example, with reference to the accompanying drawings in which.

DETAILED DESCRIPTION OF THE INVENTION

Figure 1:
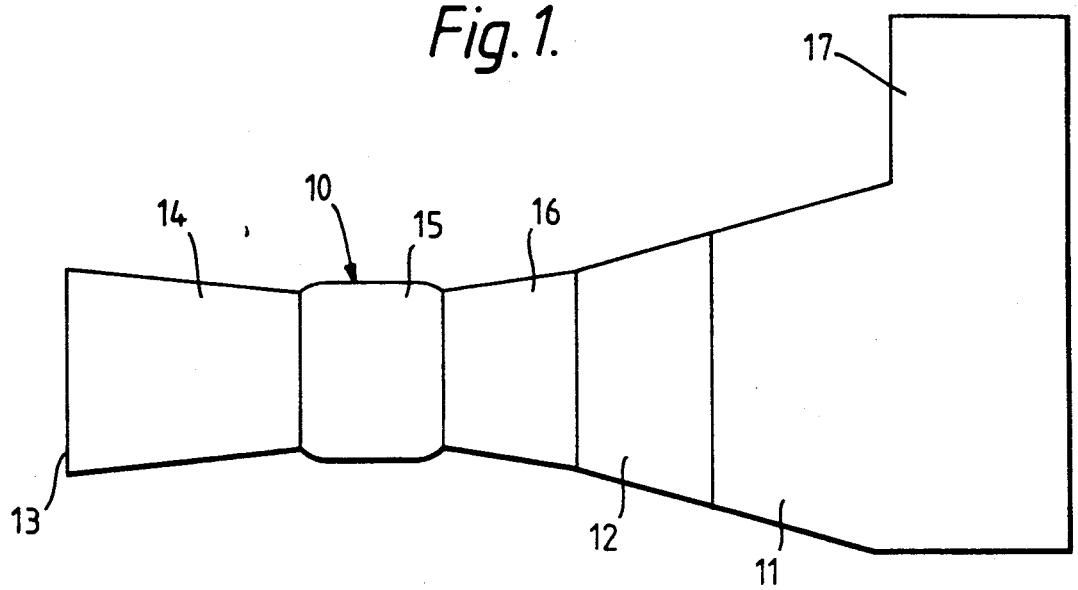
FIG. 1 is a schematic side view of an interturbine duct in accordance with the present invention interconnecting a gas turbine engine and a power turbine.

With reference to FIG. 1 a gas turbine engine generally indicated at 10 is connected to a power turbine 11 by an interturbine duct 12.

The gas turbine engine 10 is of conventional construction and comprises, in axial flow series, an air intake 13, compressor 14, combustion equipment 15 and a turbine 16. The downstream end of the turbine 16, through which, in operation, the exhaust efflux of the turbine 16 is ejected, is interconnected with the upstream end of the power turbine 11 by the interturbine duct 12 so that the engine exhaust efflux is directed into, and powers, the power turbine 11.

The power turbine is also of conventional construction having an exhaust outlet 17 and is adapted to drive any convenient load such as, for instance, an electrical generator (not shown).

Figure 2:
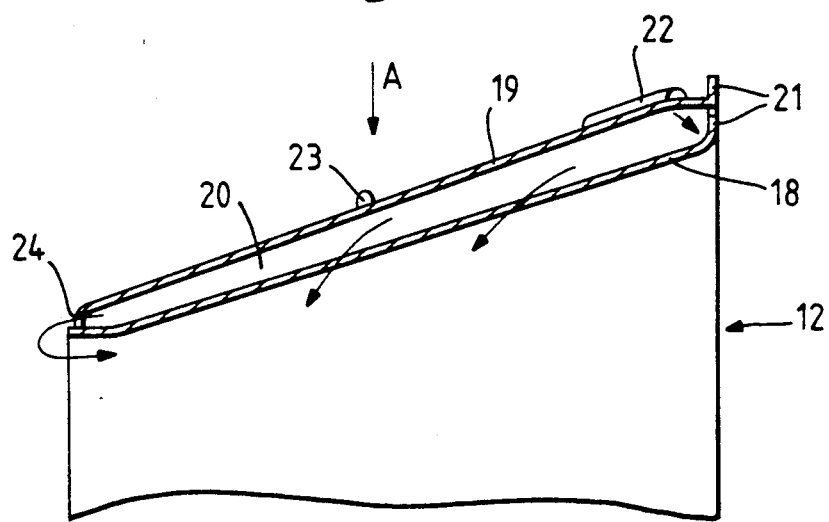
FIG. 2 is a sectioned side view of a portion of the interturbine duct shown in FIG. 1.

The interturbine duct 12 is, as can be seen in FIG. 1, of generally frusto-conical configuration. It is also, as can be seen in FIG. 2, of double skinned construction. The inner and outer skins 18 and 19 respectively are of generally corresponding configuration and are radially spaced apart (with respect to the longitudinal axis of the interturbine duct 12) so that they cooperate to define an annular cross-section volume 20 which is of generally frusto-conical configuration. Thus the outer skin 19 defines the outer surface of the interturbine duct 12 while the inner skin 18 defines the boundary of that portion of the interturbine duct 12 which contains the gas turbine engine 10 exhaust efflux.

The skins 18 and 19 are interconnected at their downstream ends by a series of dog-ringed flanges 21. The flanges 21 additionally carry a plurality of fasteners (not shown) which serve to connect the downstream end of the interturbine duct 12 to the upstream end of the power turbine 11. Parts of the fasteners protrude into the defined volume 20.

At the downstream, larger diameter extent of the interturbine duct 12, a conduit 22 is provided which serves to interconnect the downstream extent of the defined volume 20 with a source of pressurised cooling air. In the present instance, the source of cooling air is the compressor 14 of the gas turbine engine 10 although it will be appreciated that other suitable sources could be utilised if so desired.

Figure 3:
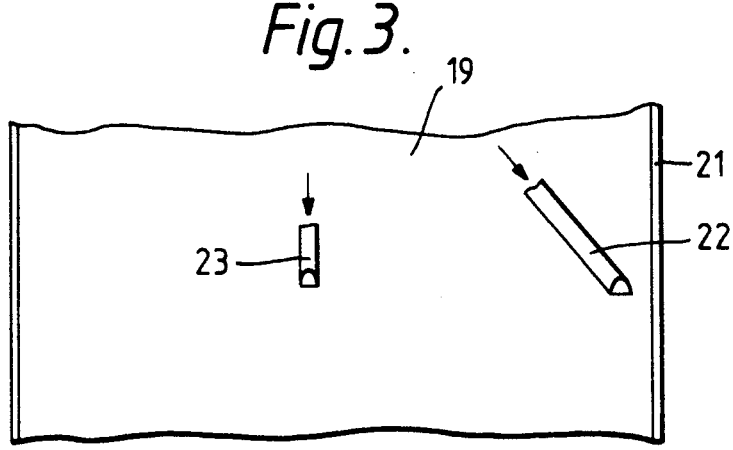
FIG. 3 is a view on arrow A of FIG. 2.

The conduit 22 is arranged to direct cooling air into the defined volume 20 in a direction which is generally tangential to the circumference of the interturbine duct 12. However the conduit 22 is angled, as can be seen more clearly in FIG. 3, so that cooling air entering the defined volume 20 has a downstream i.e. axial as well as tangential component. This is so that the cooling air provides cooling of the dog-ringed flanges 21 and their associated fasteners thereby protecting them from the potentially damaging effects of the high temperatures of the exhaust efflux gases passing operationally through the interturbine duct 12.

Cooling air is exhausted into the defined volume 20 through the conduit 22 at high velocity so that the air flows around the volume in a generally circumferential direction, thereby providing cooling of the total circumferential extent of the dog-ringed flanges 21 and their associated fasteners. However, since the defined volume 20 is of generally frusto-conical configuration, the air then proceeds to follow a generally spiral-shaped path towards the upstream, smaller diameter extent of the interturbine duct 12. A further effect is that the progressively decreasing diameter of the interturbine duct 12 results in an increase in the tangential velocity of the cooling air flow. This in turn ensures that there is a good heat transfer coefficient between the cooling air and the hot inner skin 18 and additionally minimises any cooling air velocity losses resulting from friction between the air and the skins 18 and 19.

An additional cooling air conduit 23 is provided on the interturbine duct 12 between its extents. The additional conduit 23 is also connected to the compressor 14 and serves to direct additional cooling air into the defined volume 20. The additional conduit 23 is positioned so as to direct cooling air in a solely tangential direction to reinforce the spiral-shaped cooling air flow already flowing through the defined volume 20. This second cooling air flow helps to minimise boundary layer growth in the main cooling air flow through the defined volume 20 as well as overcoming the effects of certain structural features which are likely to be present between the inner and outer skins 18 and 19.

The cooling air flow through the defined volume 20 eventually reaches the smaller diameter extent of the interturbine duct 12 where a series of apertures 24 permit the cooling air to reverse direction and flow into and mix with the exhaust efflux entering the interturbine duct 12.

It will be seen therefore that the manner of cooling the interturbine duct 12 in accordance with the present invention ensures that substantially the whole of the duct 12 is cooled by a cooling air flow without the need for baffles etc to guide that air flow. Moreover since the cooling air flow is finally exhausted into the gas turbine engine 10 exhaust efflux at the upstream end of the interturbine duct 12, the turbine efficiency losses which would be inherent in exhausting cooling air into the efflux immediately upstream of the power turbine 11 are avoided.

We claim:

1. An interturbine duct interconnecting an exhaust nozzle of a gas turbine engine with an inlet of a power turbine which is adapted to be driven by exhaust efflux of the gas turbine engine, said interturbine duct being of generally frusto-conical configuration and having an inner and outer skin radially spaced apart and of generally corresponding configuration so that said skins cooperate to define an annular cross-section volume of generally frusto-conical configuration, said radially inner skin defining an open ended passage, means being provided at a larger diameter extent of said duct to introduce a cooling fluid into said defined volume in a direction which is generally tangential to the circumference of said duct so that said cooling fluid follows a generally spiral-shaped path through said defined volume to a smaller diameter extent of said duct, means being provided at said smaller diameter extent too exhaust said cooling fluid from said defined volume, said duct including additional means to introduce a cooling fluid into said defined volume at a position intermediate said first fluid introduction means and said smaller diameter extent of said interturbine duct, said additional cooling fluid introduction means being so disposed as to cause the cooling fluid flow introduced thereby to reinforce the flow of said initially introduced cooling fluid along said generally spiral path.

2. An interturbine duct as claimed in claim 1 wherein said means provided at said smaller diameter extent to exhaust said cooling fluid from said defined volume is so arranged as to direct said cooling fluid into said passage defined by said radially inner skin.

3. An interturbine duct as claimed in claim 1 wherein the smaller diameter extent of said interturbine duct is operationally situated adjacent the downstream end of said gas turbine engine.

4. An interturbine duct as claimed in claim 1 wherein said means provided to introduce said cooling fluid into said defined volume is so disposed as to direct said cooling fluid with an axial as well as a circumferential component of direction so that said cooling fluid provides cooling of the larger diameter extent of said interturbine duct.

5. An interturbine duct as claimed in claim 1 wherein said cooling fluid is air.

6. An interturbine duct as claimed in claim 5 wherein said air is derived from the compressor of a gas turbine engine.

* * * * *